(12) United States Patent
Large et al.

(10) Patent No.: US 6,373,621 B1
(45) Date of Patent: Apr. 16, 2002

(54) METHOD AND APPARATUS FOR SAFER OPERATION OF RAMAN AMPLIFIERS

(75) Inventors: Timothy A. Large, Dunmow; Douglas James Stewart Beckett, Bishop's Stortford, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/764,946

(22) Filed: Jan. 18, 2001

(51) Int. Cl.$^7$ .............................................. H01S 03/00
(52) U.S. Cl. .................... 359/334; 359/341.44
(58) Field of Search ............................. 359/334, 341.3, 359/341.44

(56) References Cited

U.S. PATENT DOCUMENTS 5,510,931 A * 4/1996 Suyama ...................... 359/341
6,163,636 A * 12/2000 Stentz et al. ................. 385/24
6,188,508 B1 * 2/2001 Horuichi et al. ............ 359/334

* cited by examiner

Primary Examiner—Mark Hellner
(74) Attorney, Agent, or Firm—Lee, Mann, Smith, McWilliams, Sweeney & Ohlson

(57) ABSTRACT

A method of operating Raman amplification pump lasers, especially in telecommunication systems, is described and claimed, in which the Raman pump laser output powers are modulated in characteristic fashions. Parameters of these characteristic modulations may be detected at remote locations (i.e. locations along the communications fibres) even in the presence of large amounts of noise. Thus, by detecting losses of signals indicative of the characteristic modulations, breaks in the communication fibres can be detected more reliably. The disappearance of these signals can then be used to shut down the typically high power Raman pump lasers, thereby reducing the possibility of high laser powers escaping from the broken fibres. The specification also described an improved method of detecting the disappearance of a data signal at an amplifier unit, using a periodic filter to split the incoming signal into two streams, the first stream comprising data and noise, and the second comprising noise only. These two streams are then monitored to provide an indication of the presence or absence of the data signal alone. This form of signal detection can be combined with the technique of modulating the Raman pump laser output power to provide even further improved break detection and subsequent safe shut down of pump lasers.

22 Claims, 7 Drawing Sheets

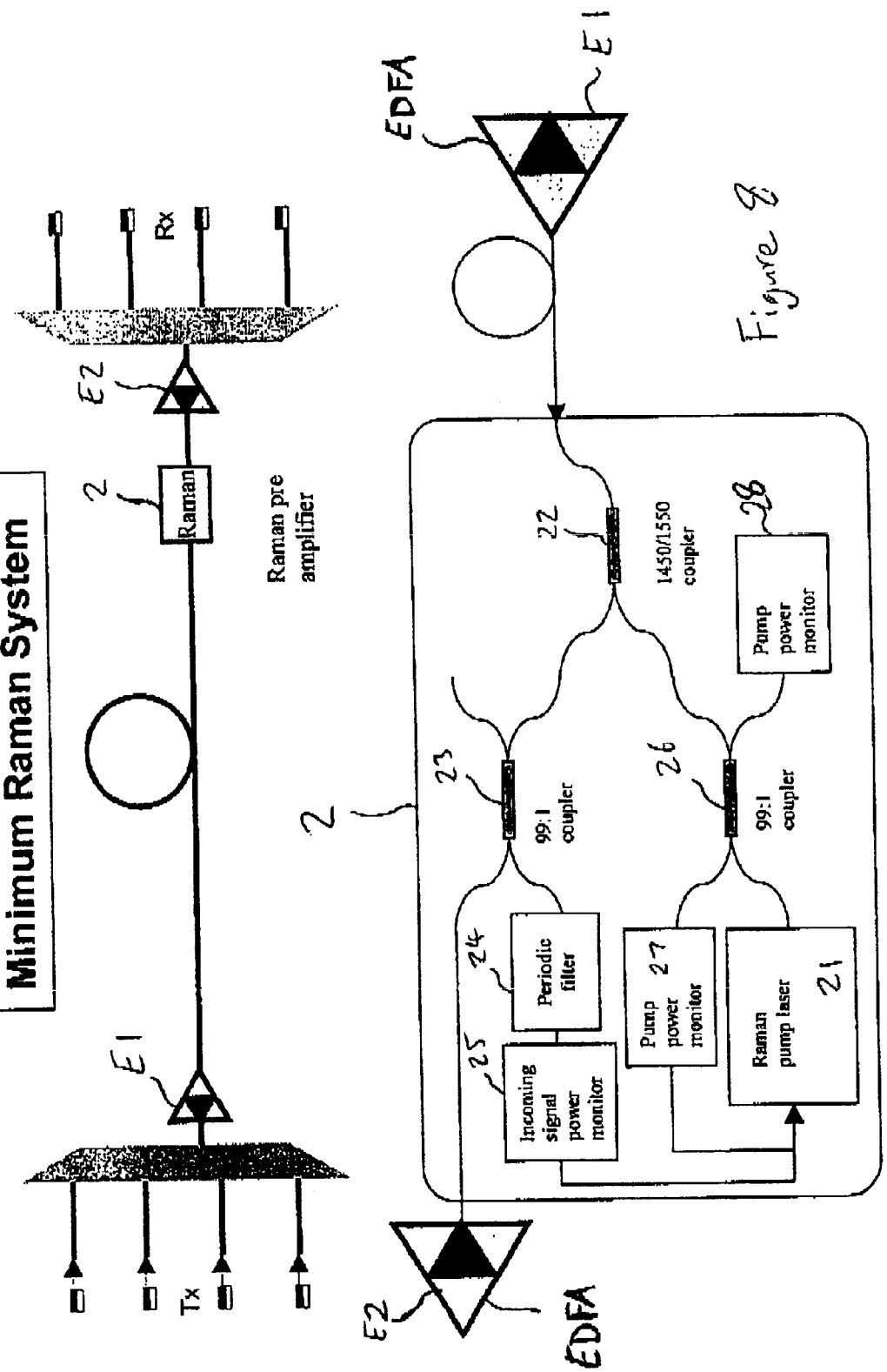

METHOD AND APPARATUS FOR SAFER OPERATION OF RAMAN AMPLIFIERS

FIELD OF THE INVENTION

The present invention relates to a method and apparatus providing safer operation of Raman amplifiers (also known as distributed Raman amplifiers), especially in communication systems.

BACKGROUND OF THE INVENTION

Distributed Raman amplifiers are become increasingly important features of today's high bandwidth optical transmission systems. Raman amplification operates by sending a pump wavelength down the system fibre, producing additional amplification of the optical signal using the silica of the fibre as a gain medium.

In order for this to be effective, substantial pump powers have to be used. Typical pump powers are up to 1 Watt optical in the 1420–1480 nm band, and when combined with the signal, the laser power could in principle be as high as 1.5 Watts. The system is preferably safe in normal operation, since no light leaks from the fibre/cable/connector assemblies, However, when open to view, the light is Laser Class 4 (dangerous by direct and scattered viewing), and to conform to international standards, requires a closed and interlocked environment, specially trained personnel, and equipment such as laser safety goggles, for handling.

In a real communications system, however, this radiation could potentially be exposed in the open by cable break, or within a telecom hut by untrained personnel pulling connectors. The danger, particularly to eyes, is enhanced since the radiation is entirely invisible but is partially transmitted by the eye to the retina.

Although a great deal of work has been undertaken on the theory and application of Raman amplifiers, little has been done to implement appropriate safety systems to guard against accidental exposure to pump radiation in real communication systems.

Traditionally, laser protection in communication systems has been achieved in two ways, either individually or in combination.

Firstly, the system can look for a back reflection from the fibre that indicates a fibre break, or broken connection, and turn the optical signal amplifier(s) off when this back reflection is seen. This system is used for example in Ebrium Doped Fibre Amplifiers (EDFAs) to bring high output power down to a safe level in the event of a fibre break.

A second mechanism is to look for a loss of signal into the pre-amplifier in the system and use this as an indication of failure.

Both of these systems have significant limitations when used in conjunction with distributed Raman amplifiers.

In a Raman amplifier, the level of amplified spontaneous back-scatter in the fibre from a high level pump signal is too high to allow a cable break to be detected in this way. This spontaneous backscatter results from reflections from imperfect system components, Rayleigh scattering, and stimulated Brillouin scattering and cannot be avoided.

Looking for loss of signal power at the amplified wavelengths is potentially attractive, but in the absence of input signal a Raman amplifier can still generate significant amplified spontaneous emission at signal wavelengths. For example, a single wavelength in a functioning transmission system may have an optical signal to noise ratio (OSNR) of 20 dB in the bandwidth of the signal. However, the noise can occupy a bandwidth 300 times greater than the signal, so the ratio of total noise power to signal power at the output of a Raman amplifier can be less than unity. As a result, a reliable indication of loss of signal by direct power measurement cannot be made.

Embodiments of the present invention therefore aim to provide methods and apparatus enabling safer (improved) operation of Raman amplifiers, especially in optical communications systems, i.e. methods and apparatus which address and overcome, at least partially, one or more of the problems associated with the previous safety systems. Thus, embodiments of the present invention aim to provide methods and apparatus which offer improved protection, e.g. in communication systems, from accidental exposure to Raman amplifier pump lasers.

SUMMARY OF THE INVENTION

According to a first aspect of the present invention there is provided a method of operating Raman amplification pump lasers in an optical communication system, the method comprising the steps of:

pumping a length of optical fibre in a first direction with the output of a first Raman amplification pump laser, from a first end of the length of fibre towards a second end;

pumping the length of fibre in a second, opposite direction with the output of a second Raman amplification pump laser, from the second end towards the first end;

modulating the output of the second pump laser with a characteristic modulation;

detecting at the first end a predetermined parameter (i.e. characteristic or feature) of the characteristic modulation; and reducing the pumping of the length of fibre in the first direction in response to ceasing to detect at the first end the predetermined parameter (i.e. in response to "losing" the characteristic signal from the second pump laser).

The characteristic modulation may take a wide variety of forms. For example, it may be a digital modulation, such as a pulse pattern or profile superimposed on the laser output. Such a pattern can be recognised (detected) remotely using signal processing techniques.

Preferably, however, the modulation takes the form of modulating the output power with a characteristic frequency, and detection involves simply detecting a signal at the appropriate characteristic frequency, received from the "other" pump laser.

Thus, as long as the signal from the second pump laser at the characteristic frequency (i.e. a unique identification frequency) is being received at the first end of the fibre, the fibre is known to be continuous (i.e. unbroken) from its first end to its second end.

More generally, as long as the parameter (i.e. characteristic) of the modulation applied to the second pump laser output can be detected (recognised) at the first end, the fibre link in between the two pumps is known to be intact. The method can therefore provide the advantage that the presence of the signal from the second pump laser, and therefore the continuity of the fibre, can be detected even when high levels of noise are being received at the first end as a result of back-scatter of the output from the first pump laser. Equally, when a break or some other kind of discontinuity in the fibre occurs, the loss of the signal at the characteristic frequency from the second pump laser can be detected at the first end even in the presence of strong reflection from the break of the output signal from the first pump laser.

Thus, the continuity of the length of optical fibre can be continuously monitored without the addition of significant hardware, complex control procedures, or specialised fibre cabling. The inventive method therefore provides a simple, cost effective way of safely operating Raman pump lasers in communication systems.

It will be appreciated that the terms "first end" and "second end" are not intended necessarily to mean that the length of fibre has any discernible "ends" as such. These terms are simply used to denote positions along the length of fibre to assist in specifying the direction of pumping from the first and second lasers. In practice, the pump lasers will typically be coupled to the length of fibre using appropriately arranged fibre optic couplers.

When the parameter can no longer be detected at the first end (e.g. when the system detects a loss of the signal from the second pump laser at the first end), the pumping of the fibre in the first direction is reduced.

Reducing the pumping may involve a partial reduction in pumping power, or alternatively a full radiation to zero (or substantially zero), i.e. the pumping may be ceased. Preferably, the reduction may be achieved by reducing the power output of the pump laser, or by re-routing the power output. Preferably, when the pumping is arranged to cease in response to the loss of the signal or parameter detection this cessation simply involves the switching off/powering down of the first pump laser. This can be performed in less than one second, and so limits the time for which the first pump laser output can escape from any break or discontinuity in the fibre. The method therefore provides improved detection of fibre breaks, in response to which the first pump laser can be shut off to improve safety.

Preferably, the output power of the or each pump laser is modulated by applying a small additive modulated current to the laser bias current. Alternatively, an external modulation device (modulator) could be used, but this has the disadvantage of associated insertion loss.

The output power may, in other embodiments, be modulated in any characteristic, unique, detectable way, e.g. digitally.

The step of reducing the pumping of the length of fibre in the first direction may, advantageously, comprise the step of reducing the output power from the first pump laser, and this reduction may comprise the step of reducing the output power partially, or fully, i.e. to zero.

Advantageously, the method may further comprise the steps of modulating the output of the first pump laser with a different characteristic modulation (e.g. with a different characteristic frequency); detecting at the second end a parameter of the different modulation (e.g. by detecting a signal at the different characteristic frequency from the first pump laser); and reducing the pumping of the length of fibre in the second direction in response to ceasing to detect (i.e. no longer detecting) the parameter of the modulation (e.g. detecting a loss of the pump signal at the different characteristic frequency). This reduction may take any one of the forms described above, with reference to the pumping from the first pump laser. Thus, the method can provide a safe shut down of both pump lasers in response to a fibre break. Each pump laser has its output power modulated in a respective characteristic fashion. This modulation therefore provides a unique identification.

Preferably, the method may further comprise the steps of:

detecting at the second end an optical data signal conveyed by the fibre in the first direction; and reducing the pumping of the fibre in the second direction in response to detecting a loss of said optical data signal.

Thus, the second pump laser may be shut down in response to a loss of a data signal resulting from a break in the fibre. When the second pump laser is switched off, the signal from it, with its characteristic modulation, is lost at the first end and accordingly the first pump laser can also be shut down. Thus, in a fraction of a second following a fibre break, both pump lasers can be safely powered down.

Advantageously, the step of detecting the optical data signal can comprise the steps of:

receiving at the second end a combined signal comprising the optical data signal superimposed on a background of noise;

using a periodic filter to split the combined signal into a first stream, comprising said optical data signal and noise, and a second stream, comprising said noise only;

monitoring the signal powers in each of the first and second streams from the periodic filter;

generating a difference signal indicative of the difference between the signal powers in the first and second streams, whereby said difference signal is indicative of the received optical data signal power; and using said difference signal as an indicator of the presence or absence of said optical data signal.

This provides the advantage that the presence or otherwise of the optical data signal received at the second end can be detected even in the presence of broad band noise, and so offers an improved loss of data signal detection method and pump laser shut down compared with previous arrangements.

According to a second aspect of the present invention there is provided a method of operating Raman amplification pump laser in an optical communication system, the method comprising the steps of:

conveying an optical data signal along a length of optical fibre in a first direction, from a first end of the length of fibre towards a second end;

pumping the length of fibre in a second, opposite direction with the output of a first Raman amplification pump laser, from the second end towards the first end;

receiving at the second end a combined signal comprising the optical data signal superimposed on a background of noise;

using a periodic filter to split the combined signal into a first stream, comprising said optical data signal and noise, and a second stream, comprising said noise only;

monitoring the signal powers in each of the first and second streams from the periodic filter;

generating a difference signal indicative of the difference between the signal powers in the first and second streams, whereby said difference signal is indicative of the received optical data signal power;

using said difference signal as an indicator of the presence or absence of said optical data signal; and reducing the pumping of the fibre in the second direction in response to detecting a loss of said optical data signal at the second end.

This provides the advantage that the presence and loss of the optical data signal can be detected even when noise levels are high (i.e. even in the presence of significant amounts of broad band noise) and so enables the pump laser to be powered down or shut down more reliably and quickly than in previous systems, thereby improving safety.

Preferably the method of the second aspect of the invention can further comprise the steps of pumping the length of fibre in the first direction with the output of a further Raman amplification pump laser, from the first end towards the second end;

modulating the output power of the first pump laser with a characteristic modulation;

detecting at said first end a predetermined parameter of the characteristic modulation; and reducing the pumping of the length of fibre in the first direction in response to ceasing to detect (i.e. no longer being able to detect) the predetermined parameter at the first end.

This provides the advantage that as soon as the loss of the optical data signal is detected at the second end, the laser pumping the fibre in the second direction can be shut down, which then results in shut down of the laser pumping the fibre in the first direction. Thus, loss of the data signal at the second end triggers safe shut down of the laser pumps pumping the fibre in both directions, thereby significantly improving safety.

According to an embodiment of a third aspect of the present invention there is provided an amplifier unit for an optical communication system, the amplifier unit comprising:

a Raman amplification pump laser adapted to pump a length of optical fibre with output power;

a detector adapted to detect a signal at a characteristic frequency received by the amplifier unit via the optical fibre from another Raman amplification pump laser pumping the length of fibre with output power modulated at the characteristic frequency; and a controller arranged to reduce the output power of the pump laser in response to the detector detecting a loss of the signal at the characteristic frequency.

Rather than using a characteristic frequency, the output of the other Raman pump can be modulated in some other characteristic way, and the detector may be arranged accordingly, for example to detect just a single characteristic parameter of the characteristic modulation.

Preferably, the output power of the Raman amplification pump laser is also modulated, at a different characteristic frequency.

According to a fourth aspect of the present invention there is provided an amplifier unit for an optical communication system, the amplifier unit comprising:

a Raman amplification pump laser adapted to pump a length of optical fibre;

a periodic filter adapted to receive a combined signal comprising an optical data signal and noise from the optical fibre, and to split the received combined signal into a first stream comprising the optical data signal and noise, and a second stream comprising the noise only;

a first photodetector arranged to generate a first power signal indicative of the signal power in the first stream;

a second photodetector arranged to generate a second power signal indicative of the signal power in the second stream;

a difference signal generator arranged to generate a difference signal indicative of a difference between said first and second power signals, said difference signal being indicative of the received optical data signal power; and a controller arranged to reduce the output power of said pump laser in response to said difference signal.

The period filter used in embodiments of the present invention may take a number of forms, and may be made in a number of ways. Ways of making suitable periodic filters include e.g. using unbalanced Mach-Zhender interferometer, array waveguides, polarisation (birefringence) filters, dielectric filters, etc. These are available from a number of manufacturers like JDS, ITF Optical, Avanex, Chorum, and Bookham. These methods, and these types of periodic filters are well known.

In an amplifier unit in accordance with the fourth aspect of the present invention the pump laser may be adapted to provide output power (i.e. power for pumping the fibre) which is modulated in a characteristic way (e.g. modulated at a characteristic frequency).

Preferably, the unit may further comprise a pump signal detector for detecting a pump signal at a different characteristic frequency received by the amplifier unit via the optical fibre from another Raman amplification pump laser pumping the length of fibre with modulated output power, and the controller may be further arranged to reduce the output power of the pump laser in response to the detector detecting a loss of the pump signal at the different characteristic frequency.

The pump signal detector may, alternatively, be arranged to detect other parameters of the characteristic modulation.

A further aspect of the present invention provides a communication system comprising a plurality of amplification units linking a chain of lengths of optical fibre, each amplifier unit comprising a Raman amplification pump laser arranged to pump an adjacent length of fibre with output power modulated with a respective characteristic modulation, each amplifier unit being arranged to detect a predetermined parameter of a different characteristic modulation applied to the output power of an adjacent amplification unit, each amplifier unit being arranged to reduce the output power of its own pump laser in response to ceasing to detect the predetermined parameter of the characteristic modulation of an adjacent amplification unit.

Preferably, each unit's pump laser output is modulated at a respective characteristic frequency, and each unit is arranged to detect a signal from adjacent units at their respective characteristic frequencies.

Preferably, the or each pump laser output power is modulated by applying an additive modulated current to the pump laser bias current.

Alternatively, a modulator (i.e. external device) can be used to modulate the pump laser output, but this involves associated insertion loss.

The term "Raman amplification pump laser" is intended to encompass a variety of known lasers, including fibre lasers. Fibre lasers may be used as Raman pump lasers in certain applications because they give much higher output powers. A fibre laser is essentially a short wavelength laser that is converted down in frequency using the Raman effect. Fibre lasers can be modulated by modulation of the pump drive current in the same way.

It will be appreciated that the terms "reducing the pumping" and "reducing the output power" used throughout this specification are intended to cover both partial reductions and full reductions (i.e. reductions to zero) unless expressly stated otherwise.

Other features and advantages of the invention will be readily apparent from the description of the preferred embodiments of the invention, from the drawings and from the claims.

BRIEF DESCRIPTION OF THE DRAWINGS

FIG. 7 is a schematic diagram of a communication system in accordance with yet a further embodiment; and FIG. 8 is a schematic diagram of the system of FIG. 7, with the Raman pre amplifier shown in more detail.

DETAILED DESCRIPTION OF PREFERRED EMBODIMENTS

Figure 1:
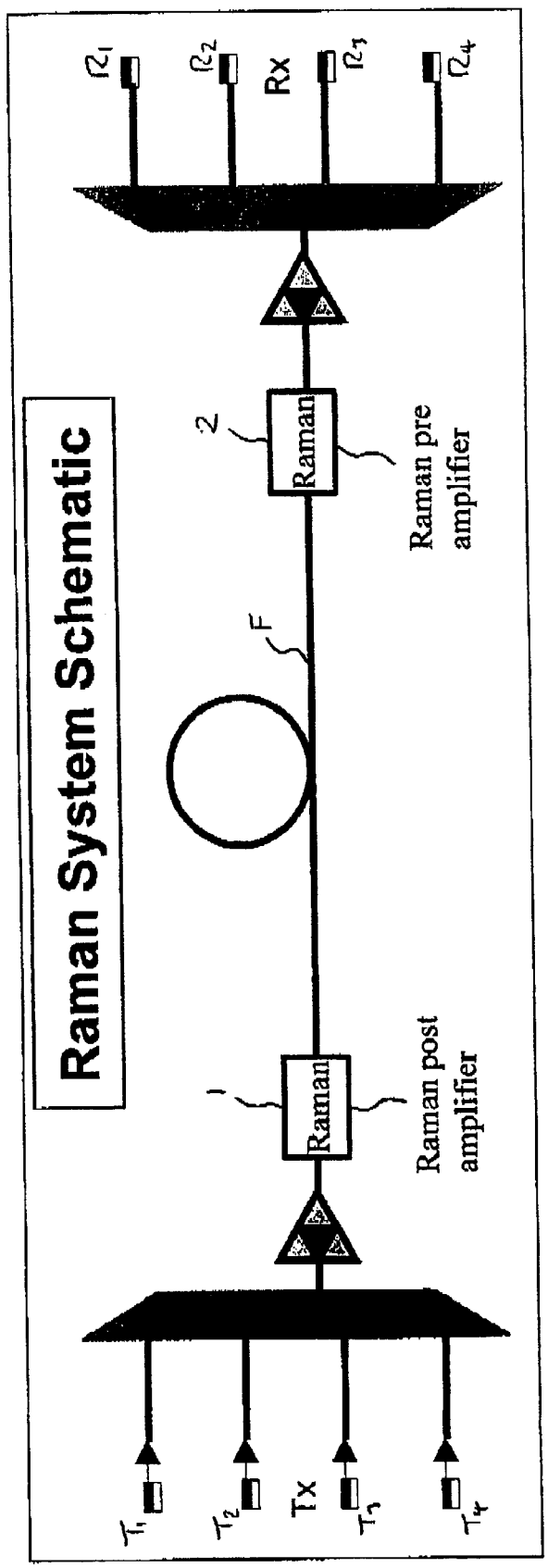
FIG. 1 is a schematic diagram of a communication system in accordance with an embodiment of the present invention.

Turning now to FIG. 1, this shows in schematic form a communication system in accordance with an embodiment of the present invention. A number of signals $T_1$ to $T_4$ are transmitted from a nominal transmitter end (Tx) of the system in wavelength division multiplexed fashion to a receiver end Rx, via an optical fibre link F. At the receiver end, the signals are de-multiplexed, becoming received signals $R_1$ to $R_4$ respectively.

Primarily to counteract the effects of losses leading to attenuation of the signals as they are transmitted along the optical fibre F Raman post and pre-amplifiers 1 and 2 are provided at the transmitter and receiver ends respectively, with the post-amplifier pumping the fibre in the nominal forward direction (i.e. the direction in which the signals travel in this example) and the pre-amplifier pumping the fibre in the reverse direction.

Figure 2:
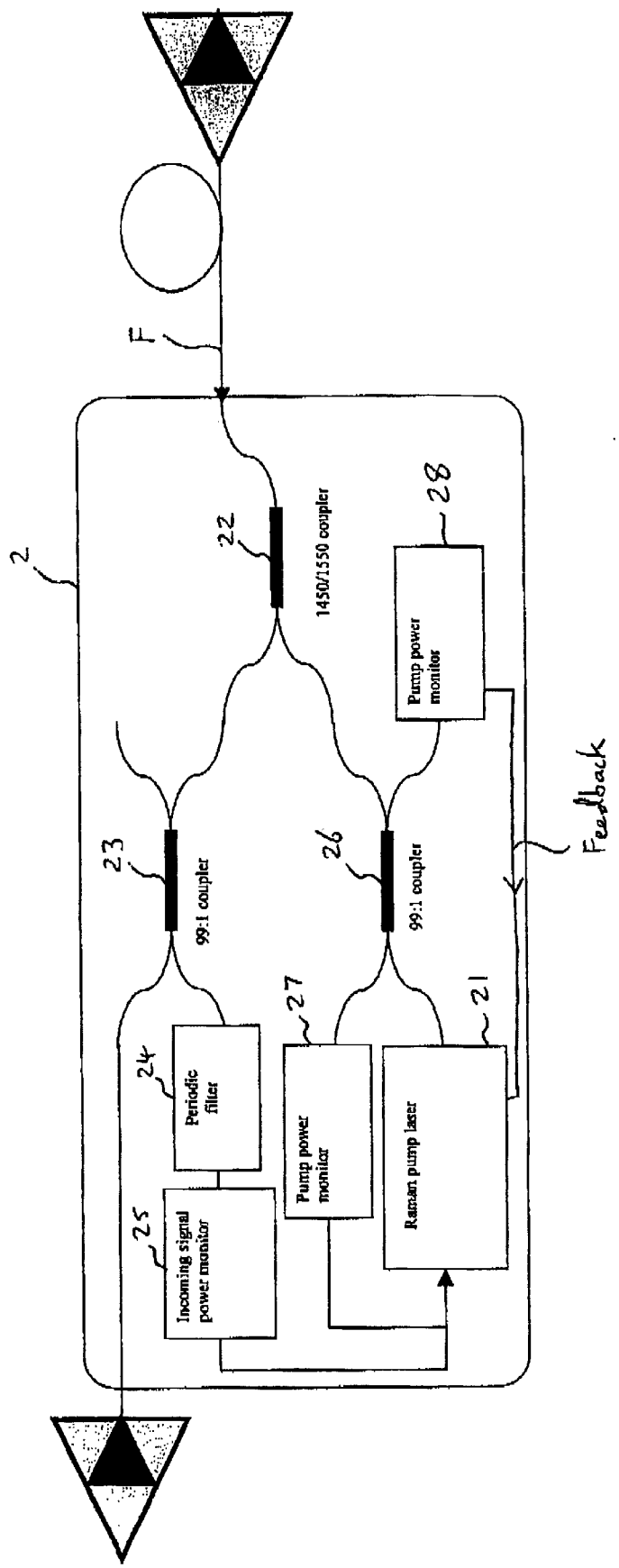
FIG. 2 is a schematic diagram of a pre-amplifier embodying the present invention, and suitable for use in the system of FIG. 1.

Turning now to FIG. 2, this shows a Raman pre-amplifier 2 suitable for use in the embodiments shown in FIG. 1. The Raman pre-amplifier (i.e. a Raman pump unit) has the following features:

A high power pump laser 21 that can be modulated with a low frequency, low level amplitude modulation with selectable electrical frequency; A coupler 22 incorporated with the pump laser that allows the pump laser to be coupled to the system fibre; A second coupler 23 is incorporated that allows the Raman laser system to monitor the signal wavelengths in the signal fibre; Incorporated with this second coupler is a periodic filter 24 whose periodicity is matched to the periodicity of the transmitter wavelengths (e.g. on the ITU grid); A third coupler 26 is incorporated that allows the Raman laser system to monitor incoming signals at Raman wavelengths.

The third coupler 26 supplies a signal to a incoming pump power monitor 27 which monitors the incoming signals at Raman wavelengths. This pump power monitor 27 is connected to the Raman pump laser to control its output. Via the third coupler 26, a pump power monitor 28 also monitors the output power of the Raman pump laser 21, and is used to provide a feedback control signal to the Raman pump laser to maintain its outputs at a constant level.

Although the embodiment shown in FIG. 2 is a Raman pre-amplifier, further embodiments in the form of Raman post-amplifiers may have the same configuration, but with a different characteristic amplitude modulation frequency of the Raman pump laser output signal. Thus, a Raman amplifier unit in accordance with an embodiment of the present invention may comprise the same components regardless of position within the communication system, but is assigned a unique amplitude modulation frequency.

Figure 3:
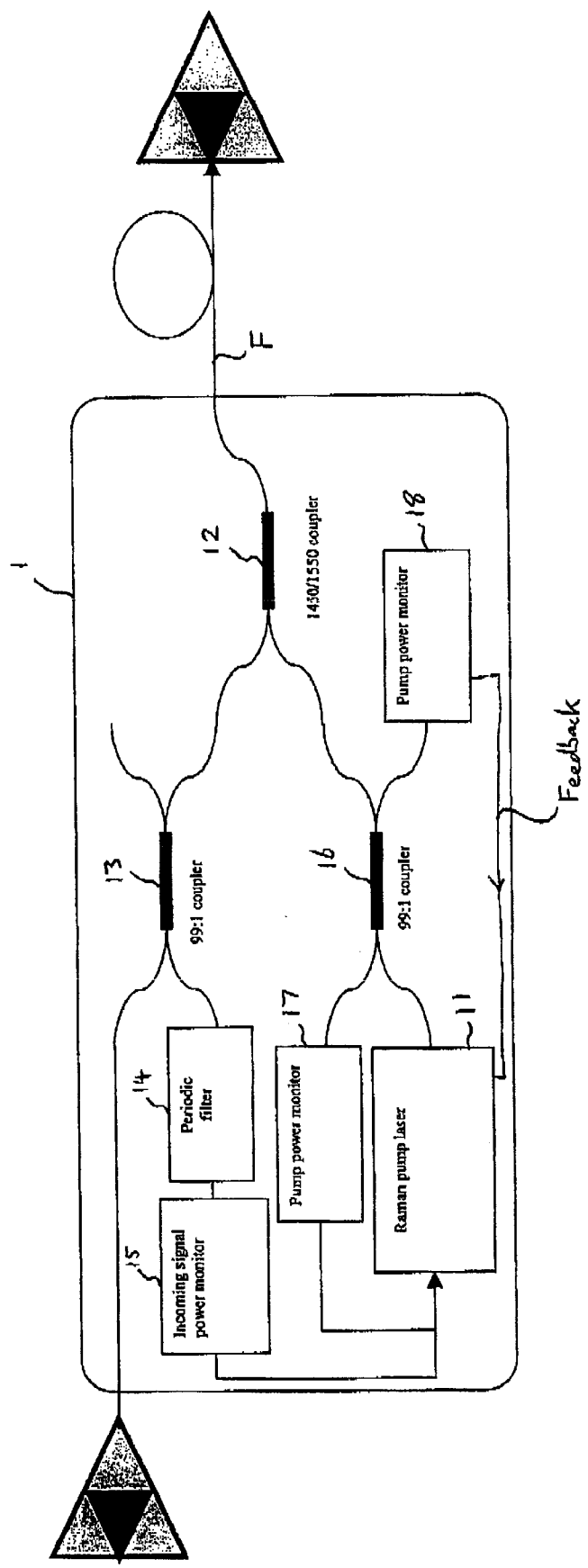
FIG. 3 is a schematic diagram of a post-amplifier embodying the present invention, and suitable for use in the embodiments shown in FIG. 1.

Moving onto FIG. 3, this shows a Raman post-amplifier 1 in accordance with an embodiment of the present invention. This amplifier unit comprises first, second and third couplers, 12, 13, and 16 respectively. It also includes a periodic filter 14, connected to an incoming signal power monitor 15, which in turn provides a signal to the Raman pump laser 11. An output power of the Raman pump laser 11 is monitored via the coupler 16 and pump power monitor 18, which in turn provides a feedback signal to the pump laser. A pump power monitor 17 monitors signals received at pump wavelengths from other pumps, or for example reflected or back scattered signals from the Raman pump laser 11 itself.

In either of the above configurations the Raman pump laser unit 1, 2 can monitor the incoming and outgoing signal levels within the 1550 nm region, as well as its own output in the 1450 nm region, and the light coming back from the system fibre in the 1450 nm region.

The function of the various components is as follows:

The Raman pump laser 11, 21 output is tapped by a coupler 16, 26 to provide feedback the the laser drive. This allows the pump laser to give stable optical output onto the line.

A second pump monitor 17, 27 allows light at the pump wavelength to be detected. This light may be from another Raman pump unit at the other end of the line or from a reflection or backscatter in the system fibre.

A WDM (wavelength division multiplexed) coupler 12, 22 couples the Raman pump light onto the system fibre F.

In pre-amp configurations this WDM also acts as a primary filter to separate the pump and signal wavelengths.

The periodic filter 14, 24 splits the signal wavelengths into two streams, one carrying signal and noise, the other just carrying noise. These are detected by two photodetectors in the signal power monitor 15, 25. Adding the two outputs gives an indication of the total signal coming into the Raman unit. Subtracting them produces a signal that is an indicator of signal presence.

Figure 4:
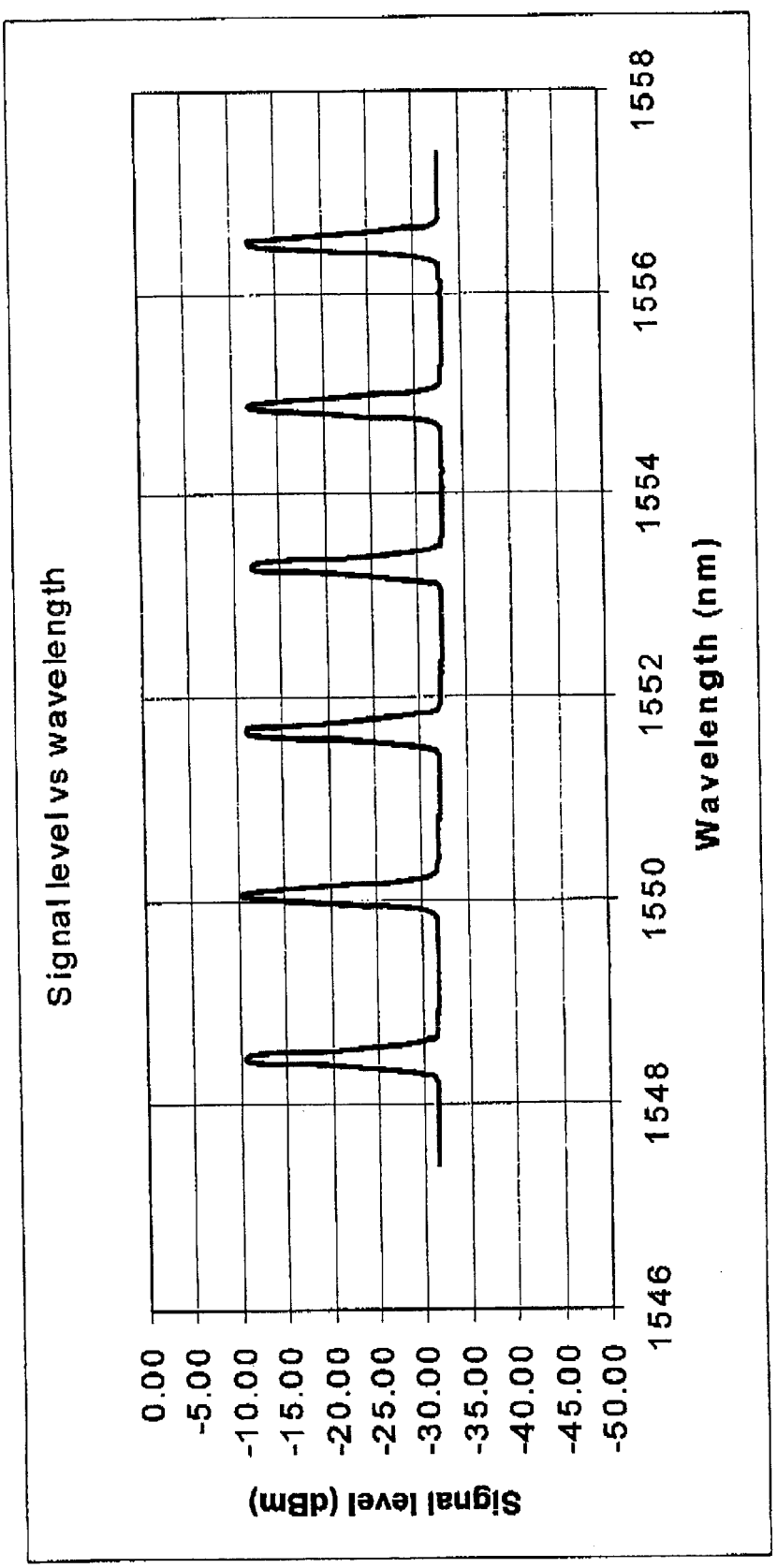
FIG. 4 if a plot of the signal received, as a function of wavelength, by the periodic filter shown in FIG. 3.
Figure 5:
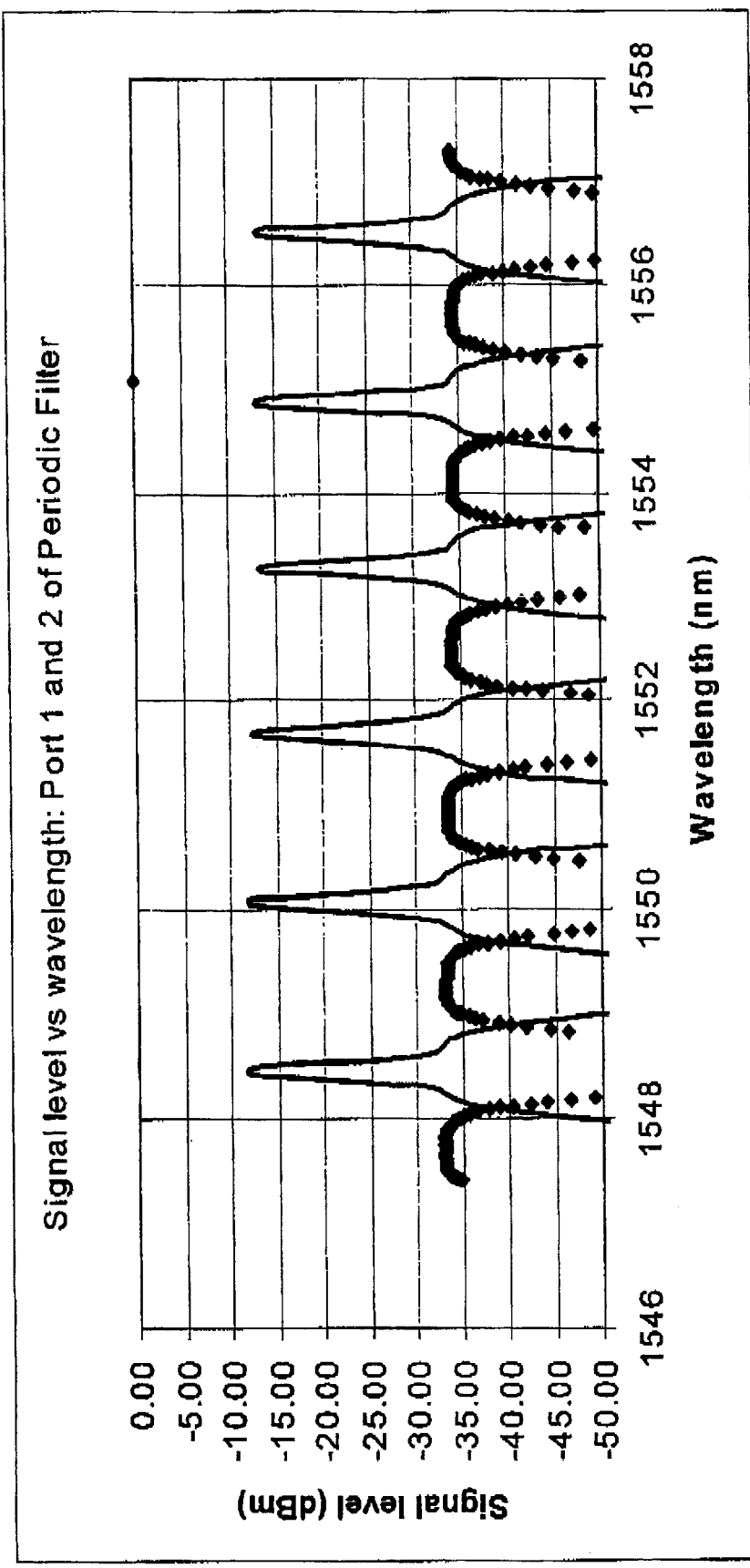
FIG. 5 is a plot of the signals, as functions of wavelengths, output from the first and second ports of the periodic filter of FIG. 3.

This is shown in FIGS. 4 and 5. A typical signal from a Raman amplifier has signal wavelengths superimpeded on a background of broadband optical noise, as shown in FIG. 4.

A periodic filter 14, 24 is used to separate the signal and noise from noise only, as shown in FIG. 5.

The power output from both arms is monitored by the power monitors 15, 25. The difference between the two measured output powers is the signal power only. In this way even a single wavelength can be detected in the presence of broadband noise.

In powering up a unidirectional communication system, the following sequence of events takes place:

Initially, the EDFA is powered up. It is able to make a first-level check for fibre faults using its own internal system of measuring back reflections at the signal wavelength.

If all is well, the signal reaches the pre-amplifier 2 at the far end of the system. This detects that a signal in the 1550 nm region is available to be amplified.

The Raman pre-amplifier 2 is then switched on. This is modulated by a low-level amplitude modulation with a unique pre-determined modulation frequency.

This unique modulation frequency is detected by the post amplifier laser unit 1, which in turn switches on. The uniqueness allows the post amplifier to detect the other amplifier even in the event of high levels of noise due to back-scatter of its own output power. The link is then operational.

In the event of a system failure caused by a fibre break or disconnection, the Raman amplifier signal detection system of the pre-amplifier looses incoming signal wavelengths and shuts down. The post amplifier at the transmitter end looses the modulated signal from the Raman pump wavelength at the receiver end, and it in turn shuts down. This process can happen in less than a second, thus eliminating any danger to personnel in the vicinity of the fibre break. In this way the Raman amplified system maintains the same laser hazard classification as a system without distributed amplification.

In a bi-directional system, where signals travel in the fibre in both directions simultaneously, each Raman pump is assigned a unique frequency and so each detects the other's presence even in the presence of high levels of fibre back-scatter of its own optical power. One end of the communication system is defined as the 'head' end of the system during system line-up and test, and power up/power down on fail procedures for the Raman pumps are exactly as described above.

Thus systems embodying the present invention allow laser-safe operation of distributed Raman amplifiers in the field without the addition of significant hardware, complex control procedures, or specialised fibre cabling.

The systems work even for low signal counts and in the presence of high levels of optical noise. The systems are also still functional even in the presence of back-scatter or back-reflection caused by imperfections in system components.

Figure 6:
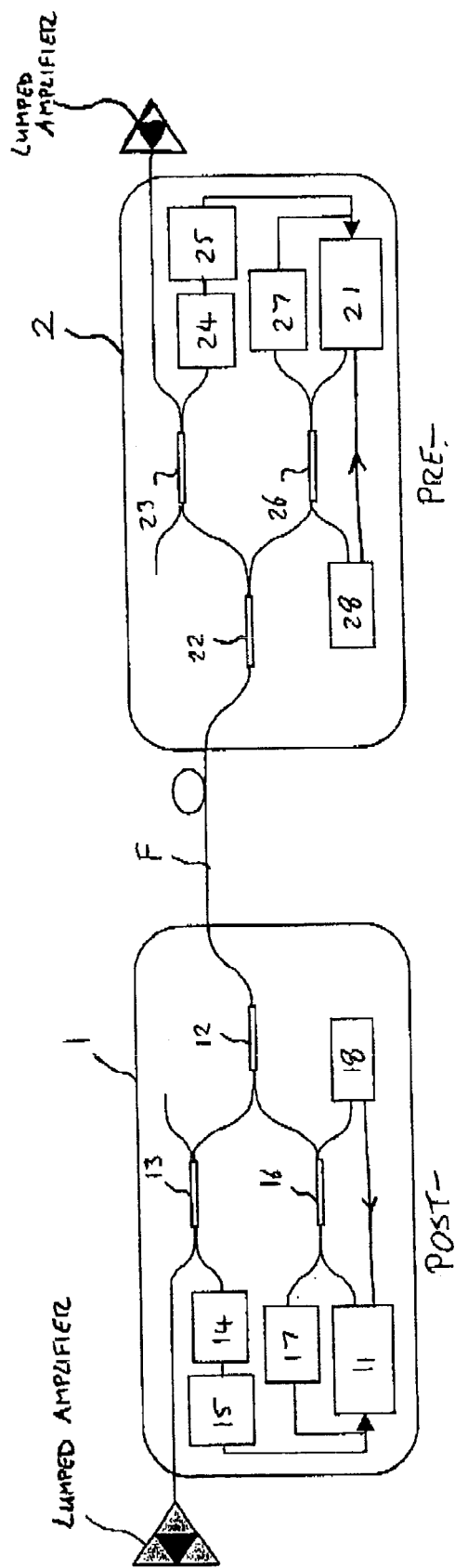
FIG. 6 is a schematic diagram of a communication system in accordance with a further embodiment of the present invention.

Turning now to FIG. 6, this shows in schematic form a communication system in accordance with an embodiment of the present invention. The system comprises post amplifier 1 and pre amplifier 2 units connected at opposite ends of a length of optical fibre F. The components of these amplifier units which correspond to those of the units described above are labelled with corresponding reference numerals. FIG. 6 also shows the lumped amplifiers at opposite ends of the system. These lumped amplifiers are usually in the form of erbium-doped fibre amplifiers (EDFAs)

Moving on to FIG. 7, this shows a further communication system embodying the present invention. This system has a Raman amplifier unit at one end only, and a high power EDFA at the other. The EDFA at the launch end is denoted by the reference E1. The erbium-doped fibre amplifier at the receiver end is denoted by reference E2.

FIG. 8 shows the Raman pre-amplifier 2 of FIG. 7 in greater detail. Components of the amplifier which correspond to those of the amplifier units described above are given corresponding reference numerals.

The Raman pre-amplifier pumps the length of communication fibre F in the reverse direction. The Raman pre-amplifier unit 2 detects the disappearance (i.e. loss) of an incoming data signal from the fibre F by using the periodic filter 24. In response to losing the incoming data signal, the pre-amplifier unit 2 closes down its Raman pump laser 21, which was previously being modulated at a characteristic output frequency.

The EDFA E1 is adapted to detect a signal from the Raman pump laser 21 at its characteristic modulation frequency, and so when E1 loses the signal at the characteristic frequency it in turn shuts down. In practice, the launch end EDFA (or EDFAs) may be outputting a significant amount of power in the forward direction along the fibre F. Thus it is important to shut down the EDFAs when a fibre break occurs. The embodiment shown in FIGS. 7 and 8 provides this facility, with the Raman pre-amplifier first detecting a loss of data signal, then shutting down its Raman pump laser, and the EDFA then responding to the loss of pump signal at the characteristic modulation frequency by itself closing down.

It will be apparent that in some systems embodying the present invention, they may launch at low power and have a high power Raman, pumping the system in the reverse direction. In such examples, the periodic filter is very useful for detecting fibre breaks, but the Raman pump laser need not be modulated. This is because relatively low power is being transmitted by the fibre in the forward direction. It is thus less important to shut down the launch end of the system in the event of a fibre break. It is more important to shut down the high power Raman pump laser pumping the fibre in the reverse direction.

What is claimed is:

1. A method of operating Raman amplification pump lasers in an optical communication system, the method comprising the steps of:

pumping a length of optical fibre in a first direction with the output of a first Raman amplification pump laser, from a first end of the length of fibre towards a second end;

pumping the length of fibre in a second, opposite direction with the output of a second Raman amplification pump laser, from the second end towards the first end;

modulating the output of the second pump laser with a characteristic modulation;

detecting at the first end a predetermined parameter of the characteristic modulation; and reducing the pumping of the length of fibre in the first direction in response to ceasing to detect at the first end the predetermined parameter.

2. A method in accordance with claim 1, wherein the step of reducing the pumping of the length of fibre in the first direction comprises the step of reducing the output power from the first pump laser.

3. A method in accordance with claim 1, wherein the step of modulating comprises modulating the output of the second pump laser with a characteristic frequency, the step of detecting comprises detecting at the first end a signal at said characteristic frequency from the second pump laser, and the step of reducing comprises reducing the pumping of the length of fibre in the first direction in response to detecting a loss of said signal.

4. A method in accordance with claim 1, further comprising the steps of:

modulating the output of the first pump laser with a different characteristic modulation;

detecting at the second end a predetermined parameter of the different characteristic modulation; and reducing the pumping of the length of fibre in the second direction in response to ceasing to detect at the second end the predetermined parameter of the different characteristic modulation.

5. A method in accordance with claim 4, wherein the step of reducing the pumping of the length of fibre in the second direction comprises the step of reducing the output power from the second laser.

6. A method in accordance with claim 4, wherein the step of modulating the output of the first pump laser comprises modulating the output of the first pump laser with a different characteristic frequency, the step of detecting at the second end comprises detecting a signal at the different characteristic frequency from the first pump laser, and the step of reducing the pumping in the second direction comprises reducing the pumping in the second direction in response to detecting at the second end a loss of the signal at the different characteristic frequency.

7. A method in accordance with claim 1, further comprising the steps of:
  detecting at the second end an optical data signal conveyed by the fibre in the first direction; and
  reducing the pumping of the fibre in the second direction in response to detecting a loss of said optical data signal.

8. A method in accordance with claim 7, wherein the step of detecting said optical data signal comprises the steps of:
  receiving at the second end a combined signal comprising the optical data signal superimposed on a background of noise;
  using a periodic filter to split the combined signal into a first stream, comprising said optical data signal and noise, and a second stream, comprising said noise only;
  monitoring the signal powers in each of the first and second streams from the periodic filter;
  generating a difference signal indicative of the difference between the signal powers in the first and second streams, whereby said difference signal is indicative of the received optical data signal power; and
  using said difference signal as an indicator of the presence or absence of said optical data signal.

9. A method of operating Raman amplification pump laser in an optical communication system, the method comprising the steps of:
  conveying an optical data signal along a length of optical fibre in a first direction, from a first end of the length of fibre towards a second end;
  pumping the length of fibre in a second, opposite direction with the output of a first Raman amplification pump laser, from the second end towards the first end;
  receiving at the second end a combined signal comprising the optical data signal superimposed on a background of noise;
  using a periodic filter to split the combined signal into a first stream, comprising said optical data signal and noise, and a second stream, comprising said noise only;
  monitoring the signal powers in each of the first and second streams from the periodic filter;
  generating a difference signal indicative of the difference between the signal powers in the first and second streams, whereby said difference signal is indicative of the received optical data signal power;
  using said different signal as an indicator of the presence or absence of said optical data signal; and
  reducing the pumping of the fibre in the second direction in response to detecting a loss of said optical data signal at the second end.

10. A method in accordance with claim 9, wherein the step of reducing the pumping of the length of fibre in the second direction comprises the step of reducing the output power from the first pump laser.

11. A method in accordance with claim 7, further comprising the steps of:
  pumping the length of fibre in the first direction with the output of a further Raman amplification pump laser, from the first end towards the second end;
  modulating the output power of the first pump laser with a characteristic modulation;
  detecting at said first end a predetermined parameter of said characteristic modulation; and
  reducing the pumping of the length of fibre in the first direction in response to ceasing to detect at said first end said predetermined parameter.

12. A method in accordance with claim 11, wherein said step of modulating comprises modulating the output power of the first pump laser with a characteristic frequency, the step of detecting at the first end comprises detecting a signal at the characteristic frequency, and the step of reducing the pumping in the first direction is in response to detecting at the first end a loss of the signal at the characteristic frequency.

13. An amplifier unit for an optical communication system, the amplifier unit comprising:
  a Raman amplification pump laser adapted to pump a length of optical fibre with output power;
  a detector for detecting via the optical fibre a predetermined parameter of a characteristic modulation applied to the output power of another Raman amplification pump laser pumping the length of fibre; and
  a controller arranged to reduce the output power of said pump laser in response to the detector ceasing to detect said predetermined parameter.

14. An amplifier unit in accordance with claim 10, wherein the output power of the Raman amplification pump laser is modulated with a different characteristic modulation.

15. An amplifier unit in accordance with claim 13, wherein said detector is arranged to detect a signal at a characteristic frequency received by the amplifier unit via the optical fibre from said another Raman amplification pump laser pumping the length of fibre with output power modulated at the characteristic frequency, and the controller is arranged to reduce the output power of the pump laser in response to the detector detecting a loss of the signal at the characteristic frequency.

16. An amplifier unit in accordance with claim 14 wherein the output power of the pump laser is modulated at a different characteristic frequency.

17. An amplifier unit for an optical communication system, the amplifier unit comprising:
  a Raman amplification pump laser for pumping a length of optical fibre;
  a periodic filter adapted to receive a combined signal comprising an optical data signal and noise from the optical fibre, and to split the received combined signal into a first stream comprising the optical data signal and noise, and a second stream comprising the noise only;
  a first photodetector arranged to generate a first power signal indicative of the signal power in the first stream;
  a second photodetector arranged to generate a second power signal indicative of the signal power in the second stream;
  a difference signal generator arranged to generate a difference signal indicative of a difference between said first and second power signals, said difference signal being indicative of the received optical data signal power; and
  a controller arranged to reduce the output power of said pump laser in response to said difference signal.

18. An amplifier unit in accordance with claim 17, wherein the Raman amplification pump laser is adapted to pump said length of optical fibre with output power modulated with a characteristic modulation.

19. An amplifier unit in accordance with claim 18, wherein the output power of the pump laser is modulated at a characteristic frequency.

20. An amplifier unit in accordance with claim 18, further comprising a detector for detecting via the optical fibre a predetermined parameter of a different characteristic modulation applied to the output power of another Raman amplification pump laser pumping the length of fibre, and wherein the controller is arranged to reduce the output power of the pump laser in response to the detector ceasing to detect the predetermined parameter of the different characteristic modulation.

21. An amplifier unit in accordance with claim 20, wherein the detector comprises a pump signal detector for detecting a pump signal at a different characteristic frequency received by the amplifier unit via the optical fibre from said another Raman amplification pump laser pumping the length of fibre with output power modulated at said different characteristic frequency, and wherein the controller is further arranged to reduce the output power of said pump laser in response to the detector detecting a loss of said pump signal at the different characteristic frequency.

22. A communication system comprising a plurality of amplification units linking a chain of lengths of optical fibre, each amplifier unit comprising a Raman amplification pump laser arranged to pump an adjacent length of fibre with output power modulated with a respective characteristic modulation, each amplifier unit being arranged to detect a predetermined parameter of a different characteristic modulation applied to the output power of an adjacent amplification unit, each amplifier unit being arranged to reduce the output power of its own pump laser in response to ceasing to detect the predetermined parameter of the characteristic modulation of an adjacent amplification unit.

* * * * *